US007778437B2

(12) United States Patent
Rhoads et al.

(10) Patent No.: US 7,778,437 B2
(45) Date of Patent: *Aug. 17, 2010

(54) MEDIA AND METHODS EMPLOYING STEGANOGRAPHIC MARKING

(75) Inventors: Geoffrey B. Rhoads, West Linn, OR (US); Brett T. Hannigan, Menlo Park, CA (US)

(73) Assignee: Digimarc Corporation, Beaverton, OR (US)

( * ) Notice: Subject to any disclaimer, the term of this patent is extended or adjusted under 35 U.S.C. 154(b) by 917 days.

This patent is subject to a terminal disclaimer.

(21) Appl. No.: 11/557,832

(22) Filed: Nov. 8, 2006

(65) Prior Publication Data

US 2007/0177760 A1 Aug. 2, 2007

Related U.S. Application Data

(63) Continuation-in-part of application No. 11/051,442, filed on Feb. 3, 2005, now Pat. No. 7,136,502, which is a continuation of application No. 09/811,366, filed on Mar. 15, 2001, now Pat. No. 6,985,600, which is a continuation-in-part of application No. 09/127,502, filed on Jul. 31, 1998, now Pat. No. 6,345,104, which is a continuation-in-part of application No. 08/967,693, filed on Nov. 12, 1997, now Pat. No. 6,122,392, which is a continuation of application No. 08/614,521, filed on Mar. 15, 1996, now Pat. No. 5,745,604, said application No. 09/811,366 is a continuation-in-part of application No. 09/553,112, filed on Apr. 20, 2000, now abandoned, and a continuation-in-part of application No. 09/562,516, filed on May 1, 2000, now Pat. No. 6,724,912, and a continuation-in-part of application No. 09/571,422, filed on May 15, 2000, now Pat. No. 6,947,571, and a continuation-in-part of application No. 09/629,401, filed on Aug. 1, 2000, now Pat. No. 6,522,770, and a continuation-in-part of application No. 09/633,587, filed on Aug. 7, 2000, now abandoned, which is a continuation-in-part of application No. 09/343,104, filed on Jun. 29, 1999, now abandoned, which is a continuation-in-part of application No. 09/314,648, filed on May 19, 1999, now Pat. No. 6,681,028, said application No. 09/811,366 is a continuation-in-part of application No. 09/640,806, filed on Aug. 17, 2000, now Pat. No. 6,438,231, and a continuation-in-part of application No. 09/689,289, filed on Oct. 11, 2000, now abandoned, which is a continuation-in-part of application No. 09/567,405, filed on May 8, 2000, now abandoned, application No. 11/557,832, which is a continuation-in-part of application No. 10/723,181, filed on Nov. 26, 2003, application No. 11/557,832, and a continuation-in-part of application No. 11/050,888, filed on Feb. 3, 2005, now Pat. No. 7,424,131, which is a continuation of application No. 09/837,564, filed on Apr. 17, 2001.

(60) Provisional application No. 60/131,005, filed on Apr. 22, 1999, provisional application No. 60/430,014, filed on Nov. 28, 2002, provisional application No. 60/475,389, filed on Jun. 2, 2003.

(51) Int. Cl.
*B42D 15/00* (2006.01)
*H04K 1/00* (2006.01)

(52) U.S. Cl. ...................................... 382/100; 283/93

(58) Field of Classification Search ................. 382/100, 382/135, 232; 380/51, 54, 55; 713/176; 283/72, 74, 75, 77, 85, 93, 94, 107, 109, 283/110, 111, 113, 901, 902; 428/195, 201, 428/203, 204, 206, 207, 211, 916, 919, 195.1, 428/211.1; 430/9, 10, 11, 13, 14, 15, 18; 503/227

See application file for complete search history.

(56) References Cited

U.S. PATENT DOCUMENTS

| 3,838,444 A | 9/1974 | Loughlin et al. | 178/5.2 R |
|---|---|---|---|
| 3,977,785 A | 8/1976 | Harris | 355/133 |
| 4,495,526 A | 1/1985 | Baranoff-Rossine | 360/15 |
| 4,675,746 A | 6/1987 | Tetrick et al. | 358/296 |

(Continued)

FOREIGN PATENT DOCUMENTS

EP 493091 A1 7/1992

(Continued)

OTHER PUBLICATIONS

Szepanski, A Signal Theoretic Method for Creating Forgery-Proof Documents for Automatic Verification, 1979 Carnahan Conference on Crime Countermeasures, Univ. of Kentucky, pp. 101-109.

(Continued)

*Primary Examiner*—Andrew W Johns

(57) ABSTRACT

Stationery, or other printable media, is encoded with a digital watermark. The watermark is not conspicuous to a human observer of the media, yet conveys plural bits of auxiliary information when optically scanned and digitally processed. The watermark can be formed by ink-jet printing, or otherwise. The encoded information can be used for various purposes, including authenticating the document as an original, linking to associated on-line resources, and distinguishing seemingly-identical versions of the same document (document serialization).

23 Claims, 8 Drawing Sheets

U.S. PATENT DOCUMENTS

| | | | |
|---|---|---|---|
| 4,739,377 A | 4/1988 | Allen | 355/133 |
| 4,790,566 A | 12/1988 | Boissier et al. | 283/91 |
| 4,835,713 A | 5/1989 | Pastor | 364/519 |
| 4,969,041 A | 11/1990 | O'Grady et al. | 358/142 |
| 5,091,966 A | 2/1992 | Bloomberg et al. | 382/21 |
| 5,103,459 A | 4/1992 | Gilhousen et al. | 375/1 |
| 5,257,119 A | 10/1993 | Funada et al. | 358/438 |
| 5,291,243 A | 3/1994 | Heckman et al. | 355/201 |
| 5,329,108 A | 7/1994 | Lamoure | 235/494 |
| 5,337,361 A | 8/1994 | Wang et al. | 380/51 |
| 5,354,097 A | 10/1994 | Tel | 283/72 |
| 5,360,235 A | 11/1994 | Drummeter et al. | 283/89 |
| 5,363,202 A | 11/1994 | Udagawa et al. | 358/501 |
| 5,465,160 A | 11/1995 | Kamo et al. | 358/401 |
| 5,471,533 A | 11/1995 | Wang et al. | 380/51 |
| 5,515,451 A | 5/1996 | Tsuji et al. | 382/135 |
| 5,530,759 A | 6/1996 | Braudaway et al. | 380/54 |
| 5,541,741 A | 7/1996 | Suzuki | 358/450 |
| 5,568,268 A | 10/1996 | Tsuji et al. | 358/296 |
| 5,568,550 A | 10/1996 | Ur | 380/3 |
| 5,572,010 A | 11/1996 | Petrie | 235/494 |
| 5,604,596 A | 2/1997 | Ukai et al. | 358/296 |
| 5,613,004 A | 3/1997 | Cooperman et al. | 380/28 |
| 5,629,770 A | 5/1997 | Brassil et al. | 358/261.1 |
| 5,633,952 A | 5/1997 | Outa et al. | 382/165 |
| 5,640,467 A | 6/1997 | Yamashia et al. | 382/181 |
| 5,647,010 A | 7/1997 | Okubo et al. | 382/165 |
| 5,652,626 A | 7/1997 | Kawakami et al. | 348/463 |
| 5,752,152 A | 5/1998 | Gasper et al. | 399/366 |
| 5,857,038 A | 1/1999 | Owada et al. | 382/284 |
| 5,859,920 A | 1/1999 | Daly et al. | 382/115 |
| 5,872,834 A | 2/1999 | Teitelbaum | 379/98.03 |
| 5,878,162 A | 3/1999 | Miyazaki et al. | 382/162 |
| 5,919,730 A | 7/1999 | Gasper et al. | 503/201 |
| 5,946,414 A | 8/1999 | Cass et al. | 382/183 |
| 6,076,738 A | 6/2000 | Bloomberg et al. | 235/494 |
| 6,289,108 B1 | 9/2001 | Rhoads | 382/100 |
| 6,343,138 B1 | 1/2002 | Rhoads | 382/100 |
| 6,345,104 B1 | 2/2002 | Rhoads | 382/100 |
| 6,421,145 B1 | 7/2002 | Kurita et al. | 358/448 |
| 6,724,912 B1 | 4/2004 | Carr et al. | 382/100 |
| 6,750,985 B2 | 6/2004 | Rhoads | 358/3.28 |
| 6,754,377 B2 | 6/2004 | Rhoads | 382/135 |
| 6,757,406 B2 | 6/2004 | Rhoads | 382/100 |
| 6,985,600 B2 * | 1/2006 | Rhoads et al. | 382/100 |
| 6,988,202 B1 | 1/2006 | Rhoads et al. | 713/176 |
| 7,068,811 B2 | 6/2006 | Powell et al. | 382/100 |
| 7,076,084 B2 | 7/2006 | Davis et al. | 382/100 |
| 7,116,781 B2 | 10/2006 | Rhoads | 380/59 |
| 7,136,502 B2 * | 11/2006 | Rhoads et al. | 382/100 |
| 7,171,018 B2 | 1/2007 | Rhoads et al. | 382/100 |
| 7,171,020 B2 | 1/2007 | Rhoads et al. | 382/100 |
| 7,280,672 B2 | 10/2007 | Powell et al. | 382/100 |
| 7,412,074 B2 | 8/2008 | Powell et al. | 382/100 |
| 7,424,132 B2 | 9/2008 | Rhoads | 382/100 |
| 2001/0019611 A1 | 9/2001 | Hilton | 380/203 |

FOREIGN PATENT DOCUMENTS

| | | |
|---|---|---|
| GB | 2217258 A | 10/1989 |
| JP | 05-236424 A | 9/1993 |
| WO | WO 0045344 A1 | 8/2000 |

OTHER PUBLICATIONS

Komatsu, A Proposal on Digital Watermark in Document Image Communication and Its Application to Realizing a Signature, Published: Electronics and Communications in Japan, Part 1, vol. 73, No. 5, 1990, pp. 22-33.

Tanaka, A Digital Signature Scheme on a Document for MH Facsimile Transmission, Electronics and Communications in Japan, Part 1, vol. 74, No. 8, 1991, pp. 30-37.

Tanaka, Embedding the Attribute Information into a Dithered Image, Systems and Computers in Japan, vol. 21, No. 7, 1990. pp. 43-50.

Bruckstein, A Holographic Transform Domain Image Watermarking Method, Circuits, Systems and Signal Processing, vol. 17, No. 3, pp. 361-389, 1998 (includes Bell Labs "Internal Memo" of Sep. 1994 as appendix).

Burgett et al., "A Novel Method for Copyright Labeling Digitized Image Data." Sep. 7, 1994, 12 pages.

Hara, An Improved Method of Embedding Data Into Pictures by Module Masking, IEEE Transactions on Communications vol. 36, No. 3, Mar. 1988.

Hecht. Embedded Data Glyph Technology for Hardcopy Digital Documents, Proc. Color Imaging; Device-Independent Color, Color Hardcopy and Graphic Arts III, SPIE—The Int'l Soc. Optical Engineering, Bellingham, Wash., vol. 2171, 1994 pp. 340-352.

Koch et al, "Copyright Protection for Multimedia Data," Proc. Of the Int. Conf. On Digital Media and Electronic Publishing. Leeds, U.K., 15 pages. Dec. 1994.

Komatsu, Authentication System Using Concealed Image in Telematics, Memoirs of the School of Science and Engineering, Waseda Univ., No. 52, pp. 45-60, 1988.

Matsui, Video-Steganography: How to Secretly Embed a Signature in a Picture, Proc. Technoiogical Strategies for Protecting Intellectual Property in the Networked Multimedia Environment, vol. 1, issue 1, Jan. 1994, pp. 187-205 (presented Apr. 1993).

Nakamura, A Unified Coding Method of Dithered Image and Text Data Using Micropatterns, Electronics and Communications in Japan, Part 1, vol. 72, No. 4, pp. 50-56, 1989.

Tirkel, Electronic Watermark, DICTA-93 Macquarie University, Sydney Australia, pp. 666-672, Dec. 1993.

Wagner, Fingerprinting, IEEE Proc. Symp. On Security and Privacy, Apr. 1983, pp. 18-22.

Xydeas, Embedding Data into Pictures by Modulo Masking, IEEE Trans. on Communications, vol. COM-32, No. 1, pp. 56-69, Jan. 1984.

* cited by examiner

MEDIA AND METHODS EMPLOYING STEGANOGRAPHIC MARKING

RELATED APPLICATION DATA

This application is a continuation-in-part of application Ser. No. 11/051,442, filed Feb. 3, 2005 (now U.S. Pat. No. 7,136,502), which is a continuation of application Ser. No. 09/811,366, filed Mar. 15, 2001 (now U.S. Pat. No. 6,985,600), which is a continuation-in-part of each of the following applications:

a) Ser. No. 09/127,502, filed Jul. 31, 1998 (now U.S. Pat. No. 6,345,104), which is a continuation-in-part of Ser. No. 08/967,693, filed Nov. 12, 1997 (now U.S. Pat. No. 6,122,392), which is a continuation of Ser. No. 08/614,521, filed Mar. 15, 1996 (now U.S. Pat. No. 5,745,604), which is a continuation of Ser. No. 08/215,289, filed Mar. 17, 1994, now abandoned;

b) Ser. No. 09/553,112, filed Apr. 20, 2000 (now abandoned), which claims priority from application 60/131,005, filed Apr. 22, 1999;

c) Ser. No. 09/562,516, filed May 1, 2000 (abandoned);

d) Ser. No. 09/562,524, filed May 1, 2000 (now U.S. Pat. No. 6,724,912);

e) Ser. No. 09/571,422, filed May 15, 2000 (now U.S. Pat. No. 6,947,571);

f) Ser. No. 09/629,401, filed Aug. 1, 2000 (now U.S. Pat. No. 6,522,770);

g) Ser. No. 09/633,587, filed Aug. 7, 2000 (now abandoned), which is a continuation-in-part of Ser. No. 09/343,104, filed Jun. 29, 1999 (abandoned), which is a continuation-in-part of Ser. No. 09/314,648, filed May 19, 1999 (now U.S. Pat. No. 6,681,028);

h) Ser. No. 09/640,806, filed Aug. 17, 2000 (now U.S. Pat. No. 6,438,231);

i) Ser. No. 09/689,289, filed Oct. 11, 2000 (now abandoned), which is a continuation-in-part of Ser. No. 09/567,405, filed May 8, 2000 (now abandoned);

This application is also a continuation-in part of the following applications:

j) Ser. No. 10/723,181, filed Nov. 26, 2003 (now published as US 20040263911), which claims priority from provisional applications Nos. 60/430,014, filed Nov. 28, 2002, and 60/475,389, filed Jun. 2, 2003; and k) Ser. No. 11/050,888, filed Feb. 3, 2005, now U.S. Pat. No. 7,424,131 which is a continuation of Ser. No. 09/837,564, filed Apr. 17, 2001 (now abandoned).

Claims directed to blank paper media have earlier issued to the present assignee in U.S. Pat. Nos. 5,850,481, 5,822,436, and 6,111,954, and 6,438,231.

FIELD OF THE INVENTION

The present invention relates to steganographic encoding of substrates—such as blank paper, wherein the encoding is not apparent or conspicuous to human observers, yet is detectable by visible light scanning of the media.

BACKGROUND AND SUMMARY OF THE INVENTION

In a great variety of applications, it is desirable for documents and other substrates to convey digital information.

Printed bar codes are one way of encoding digital data on documents, but bar codes are unsuited for many applications due to aesthetics, etc. Magnetic stripes can be used in some circumstances, but again the stripe is conspicuous, and reading the stripe requires a reader device that is not generally available. Radio frequency ID (RFID) is another technology that is sometimes used, but the cost is prohibitive for most applications, and specialized readers are again required.

For those situations in which the marking needs to be both inconspicuous and low cost, digital watermarking offers a promising alternative. Digital watermarking involves making subtle changes to a substrate's appearance (e.g., by ink speckling, texturing, background printing, or other techniques detailed in the literature)—changes that generally pass unnoticed by human viewers but that can be sensed by optical techniques (e.g., webcams, scanners, digital cameras) and decoded by computer processing of the resulting image data to extract the encoded information. Application Ser. No. 09/503,881 (now U.S. Pat. No. 6,614,914) details illustrative watermark encoding/decoding technology. A great number of other techniques are known to artisans in the field, and can be alternatively used. (The following specification commonly uses the term "watermarking" as shorthand for "digital watermarking." This steganographic form of digital data encoding is different than the paper watermarks that have, for centuries, been used in certain documents.)

The present assignee has filed many patent applications that have dealt with digital watermarking of paper and other substrates. The present application serves to compile these various works into a consolidated filing.

Application Ser. No. 09/640,806 (now U.S. Pat. No. 6,438,231), with priority back to application Ser. No. 08/215,289, filed Mar. 17, 1994 (through intervening U.S. Pat. Nos. 5,822,436 and 6,111,954) teaches that blank photographic paper and photographic film can be pre-processed—before exposure—to encode digital watermark information. When the paper/film is thereafter developed, the encoded information permeates the exposed image. That application also discusses substrate texturing as a way of effecting digital watermarking.

Application Ser. No. 09/127,502 (now U.S. Pat. No. 6,345,104) teaches how a watermark pattern can be formed in the background of a printed document, such as by speckling small droplets of ink, or printing a mesh or weave of very thin lines. Ink-jet, intaglio, offset litho, letterpress, xerography, and other printing processes can be used. Such printing can be used to impart a tint to paper while simultaneously encoding auxiliary data (the watermark payload). Watermark encoding by texturing, such as by use of embossing pressure rollers or intaglio plates, is also discussed. Such processes can be performed by the end-user of the paper, or earlier, e.g., by a paper manufacturer. Moreover, they can be applied to the base substrate, or to a laminate layer (which may be clear) that is applied to the base substrate. The background patterning can encode both the auxiliary data payload, and calibration/orientation information that helps the decoder determine (and compensate for) rotation or scaling of the scan data prior to decoding. The encoding can extend across the entire document/substrate, or can be restricted to certain areas.

Application Ser. No. 09/562,524 (now U.S. Pat. No. 6,724,912) particularly considers watermarking of laminate layers and synthetic substrates by techniques including opacification, laser ablation and cutting, and gravure printing. This application also considers how a single sheet of blank media can be encoded to convey different watermarks in different regions.

Application Ser. No. 09/562,516 details a variety of techniques for digitally encoding blank media, including printing watermark patterns with inks whose spectral response extends into UV or IR, and printing with combinations of inks. This application also recognizes that the selection of inks can be tailored to the spectra of expected illumination sources.

Application Ser. No. 09/553,112 details how particular line patterns can be designed to encode desired digital watermark information on documents and substrates. According to one method, a watermark tile is first defined—specifying luminance values in different regions. Lines are then formed between different areas in accordance with the values in the watermark tile.

Application Ser. Nos. 09/571,422 and 09/633,587 detail how a printed document, such as a business card, greeting card, product packaging, postal mail, catalog, magazine, credit card, office document, driver's license, book jacket, event ticket, etc., can be encoded with a digital watermark that corresponds to an electronic address. When presented to an imaging system, such as a webcam-equipped computer or other device, the resulting image data is processed to decode the watermark. The device then establishes a link to the electronic address in order to provide the user with additional information or content related to the original document, or to trigger an associated action. (The electronic address can be literally encoded in the watermark. More commonly, however, the watermark encodes an identifier. After detection, the decoding device uses this identifier to access a data structure, such as a remote database, to obtain a corresponding address.) These applications also contemplate that the encoding can be applied to blank media, such as blank magazine paper stock, and blank Post-It brand adhesive note pages. After end use by a consumer, the encoding persists, permitting linking or other watermark-based functionality.

Application Ser. No. 09/631,409 expands on the foregoing—particularly considering systems that link from invoices, bank statements and checks, and other account paperwork to associated on-line resources. By such arrangements, consumers can review billing history, make electronic payments, correspond with the banking or commercial institution, print completed checks, etc.

Application Ser. No. 09/498,223 (now U.S. Pat. No. 6,574, 350) and Ser. No. 09/433,104 (now U.S. Pat. No. 6,636,615) detail "fragile" digital watermarks, i.e., watermarks that are designed to be lost, or to degrade in a predictable manner, when subject to certain forms of processing (e.g., scanning and printing, or photocopying). A watermark may be made fragile in numerous ways. One form of fragility relies on low watermark amplitude. That is, the strength of the watermark is only marginally above the minimum needed for detection. If any significant fraction of the signal is lost, as typically occurs in photocopying operations, the watermark becomes unreadable. Another form of fragility relies on the watermark's frequency spectrum. High frequencies are typically attenuated in the various sampling operations associated with digital scanning and printing. Even a high amplitude watermark signal can be significantly impaired, and rendered unreadable, by such photocopying operations. Fragile watermarks can be combined with more traditional, "robust" watermarks within a single document. The former serves to authenticate the document as an original. The latter serves to tag the document with a persistent set of auxiliary data (which can be used for any of the purposes for which watermarks are used).

Application Ser. No. 09/689,289 details particular applications of document watermarking in fields relating to stationary, postal mail and postage. Exemplary applications include document serialization, authentication, copy-control, envelope franking, internet linking, encoding of delivery address information, etc. Again, watermarking of blank printing stock is contemplated. Large lots of documents can be watermarked with the same data payload, or each sheet can convey a unique watermark payload. Corporate stationary can be marked with a fragile watermark to permit a genuine document to be distinguished from a photocopy or other reproduction.

Application Ser. No. 09/619,264 details that printers (including fax machines, photocopiers, etc.) can include optical sensors and decode watermark information from blank paper stock. This watermark can signal to the printer the particular type of paper about to be printed (e.g., glossy photo stock, corporate letterhead, etc.). The printer can then tailor its printing attributes in accordance with the particular paper being printed. The substrate watermark can be implemented using a variety of techniques, including clear inking.

Application Ser. No. 09/629,401 (now U.S. Pat. No. 6,522, 770) details how office documents, such as printed spreadsheets, can include a background (or other) watermark pattern. When presented to a webcam, or other such device, an associated computer can decode the watermark and, from this information, identify where the document is stored. The document can then be loaded from such storage, and a corresponding program launched to permit on-screen review or editing. Meta-data associated with the document can also be recalled by reference to the watermark. The encoding of the watermark in the printed output can be effected transparently to the user, such as by the application program (Excel), by printer driver software, or by the printer itself.

Application Ser. No. 09/803,167, filed Mar. 9, 2001 (now published as US 20020126871) details how a substrate can be treated so that, when printed with unwatermarked text or imagery, the resulting document will be watermarked. This can be done, e.g., by locally tailoring the ink absorption attributes of different regions on the page, such as by a finely patterned waxy coating.

DETAILED DESCRIPTION

Figure 1:
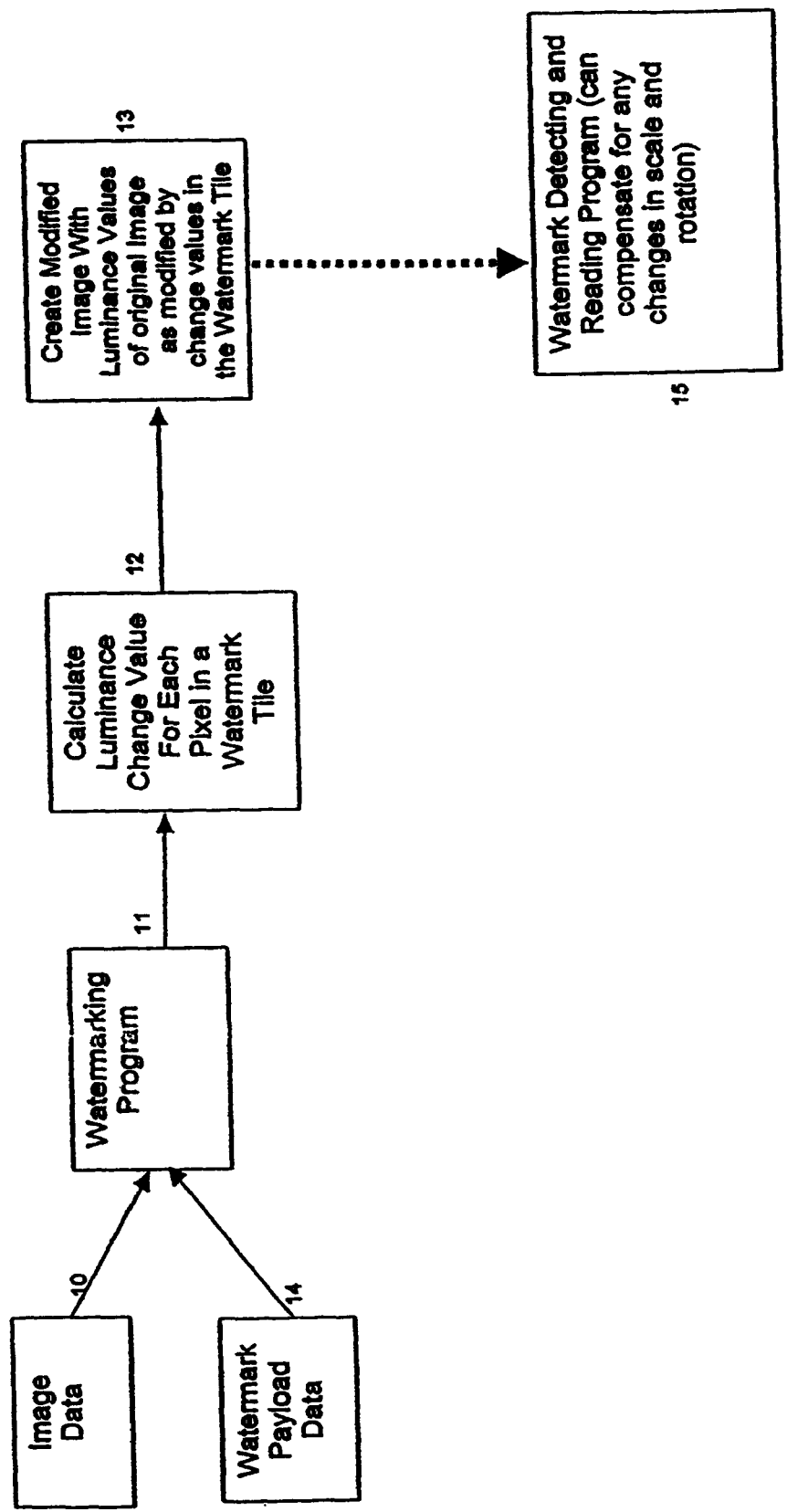
FIG. 1 shows a prior art watermarking system.
Figure 2:
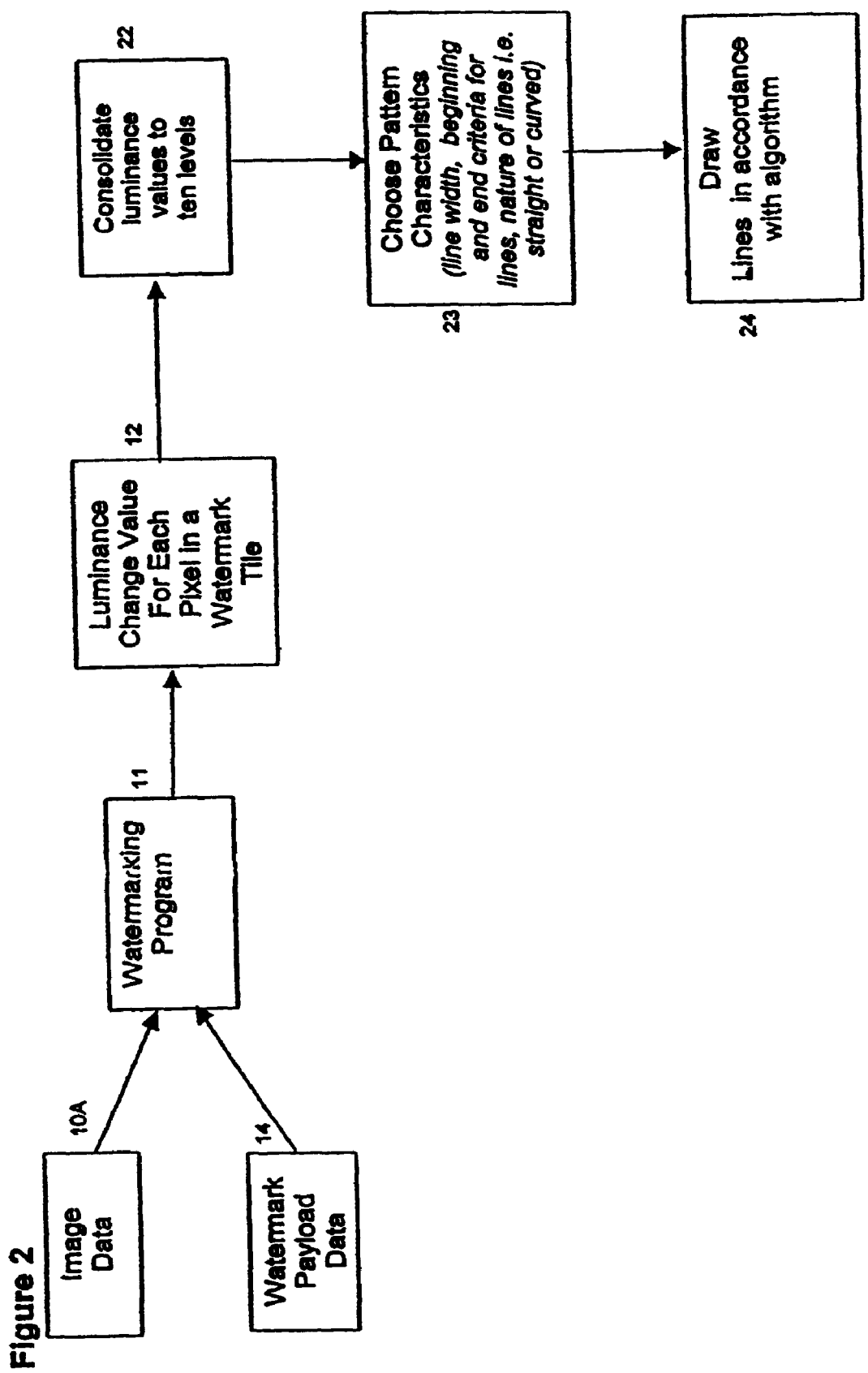
FIG. 2 is an overall system diagram of an embodiment of the present invention.
Figure 3:
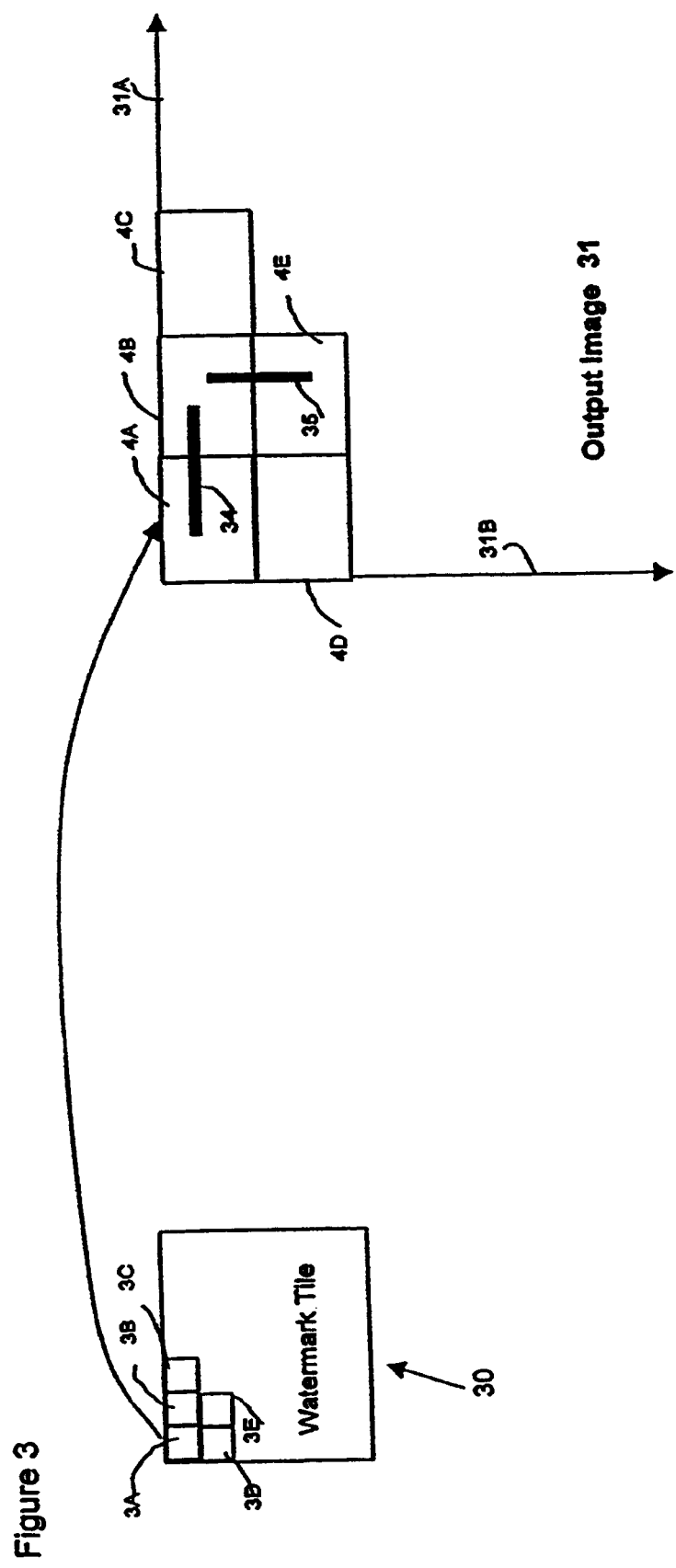
FIG. 3 illustrates correspondence between luminance values in a watermark tile, and areas in the output image.
Figure 4:
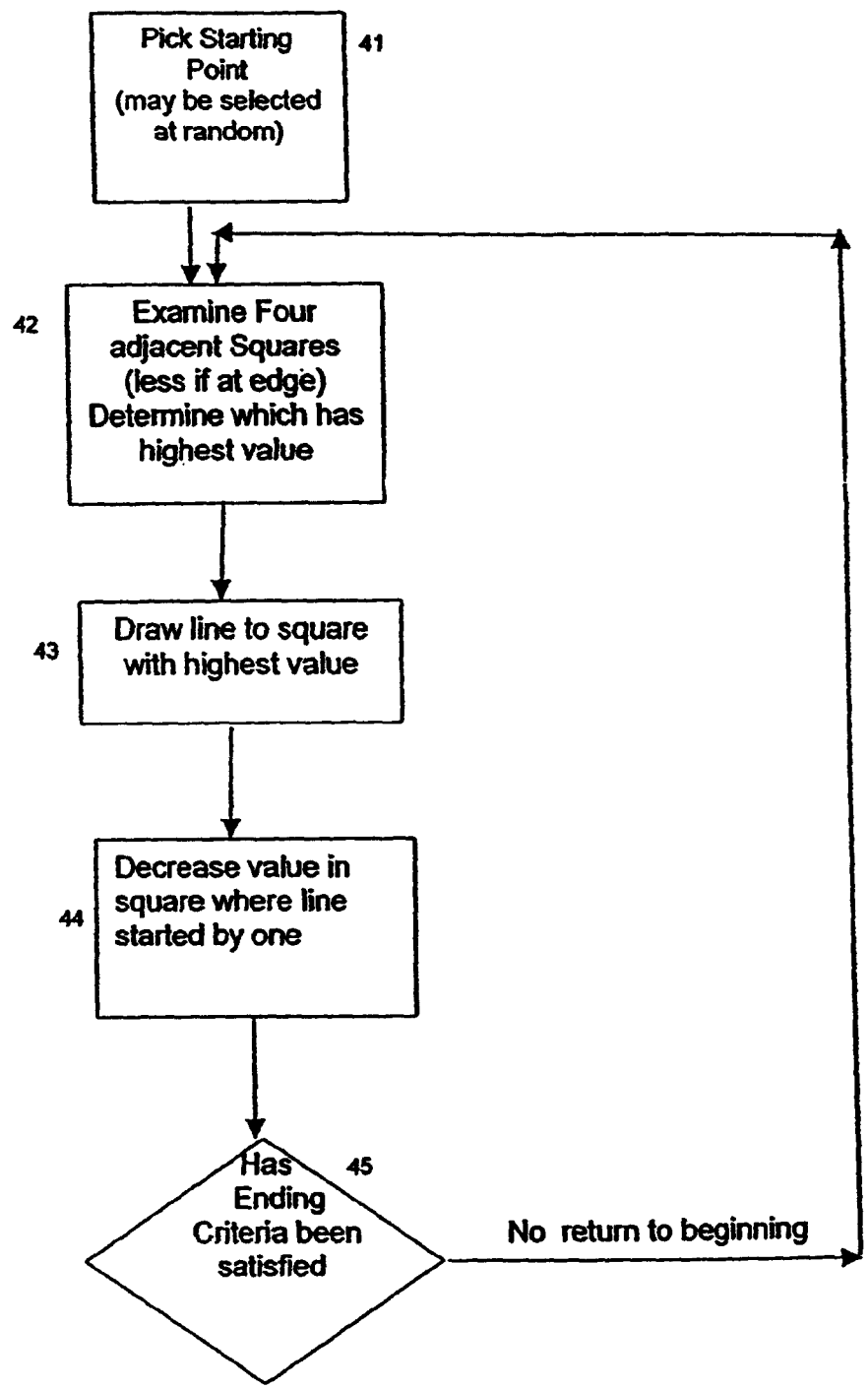
FIG. 4 is a flow diagram of an embodiment according to the present invention.
Figure 5:
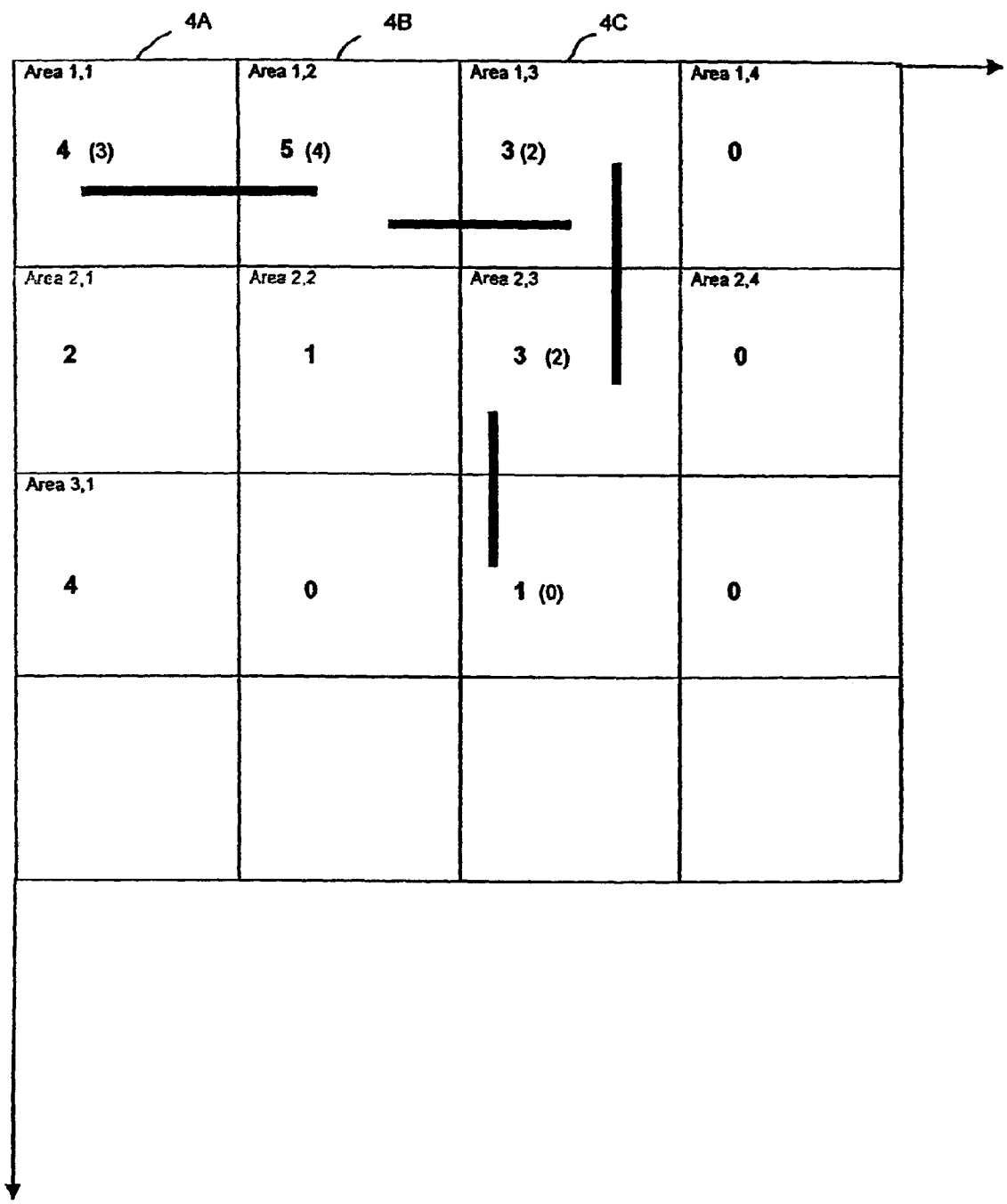
FIG. 5 shows the lines in an output image.
Figure 6:
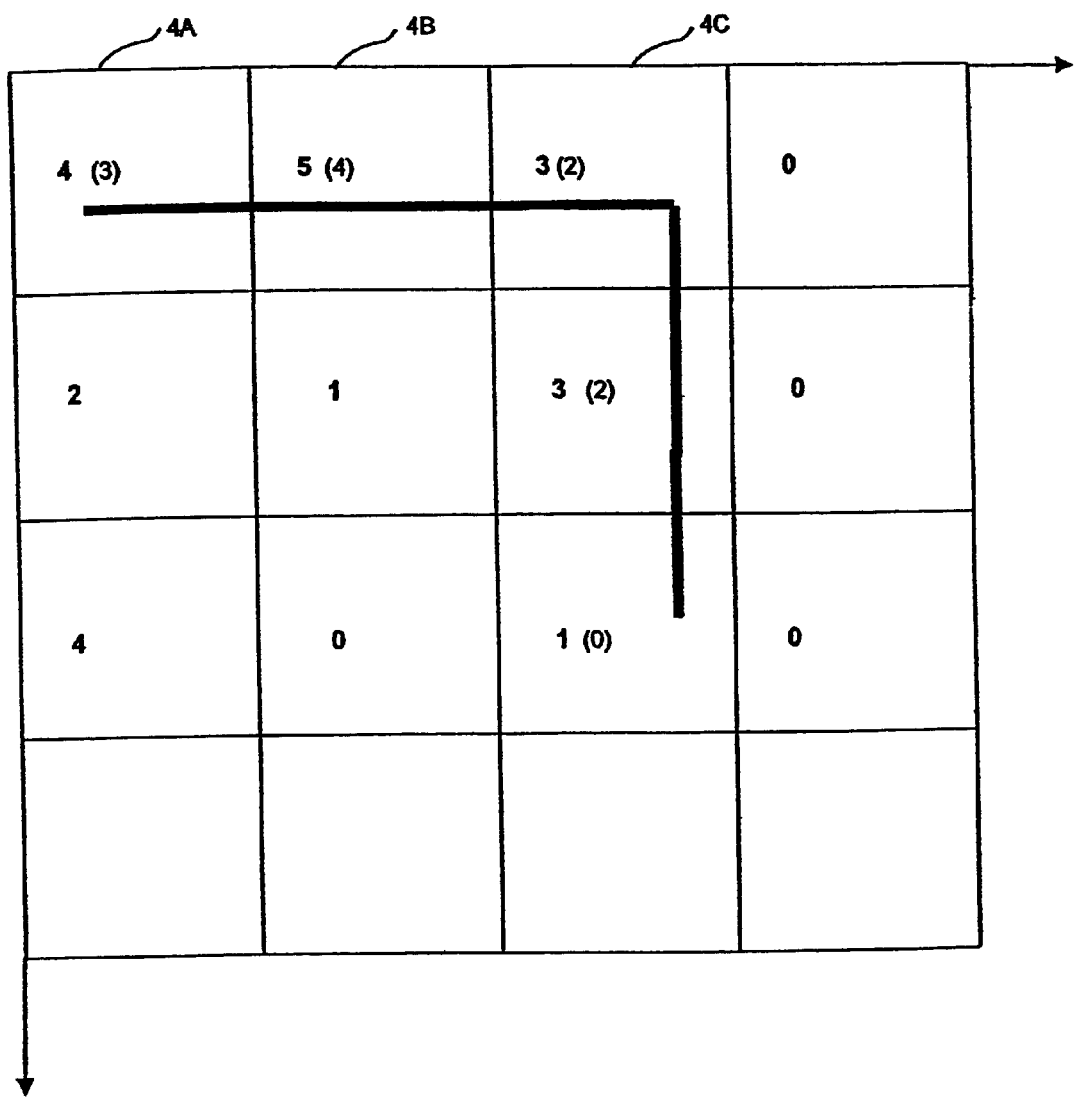
FIG. 6 shows an alternative arrangement of lines in an output image.
Figure 7:
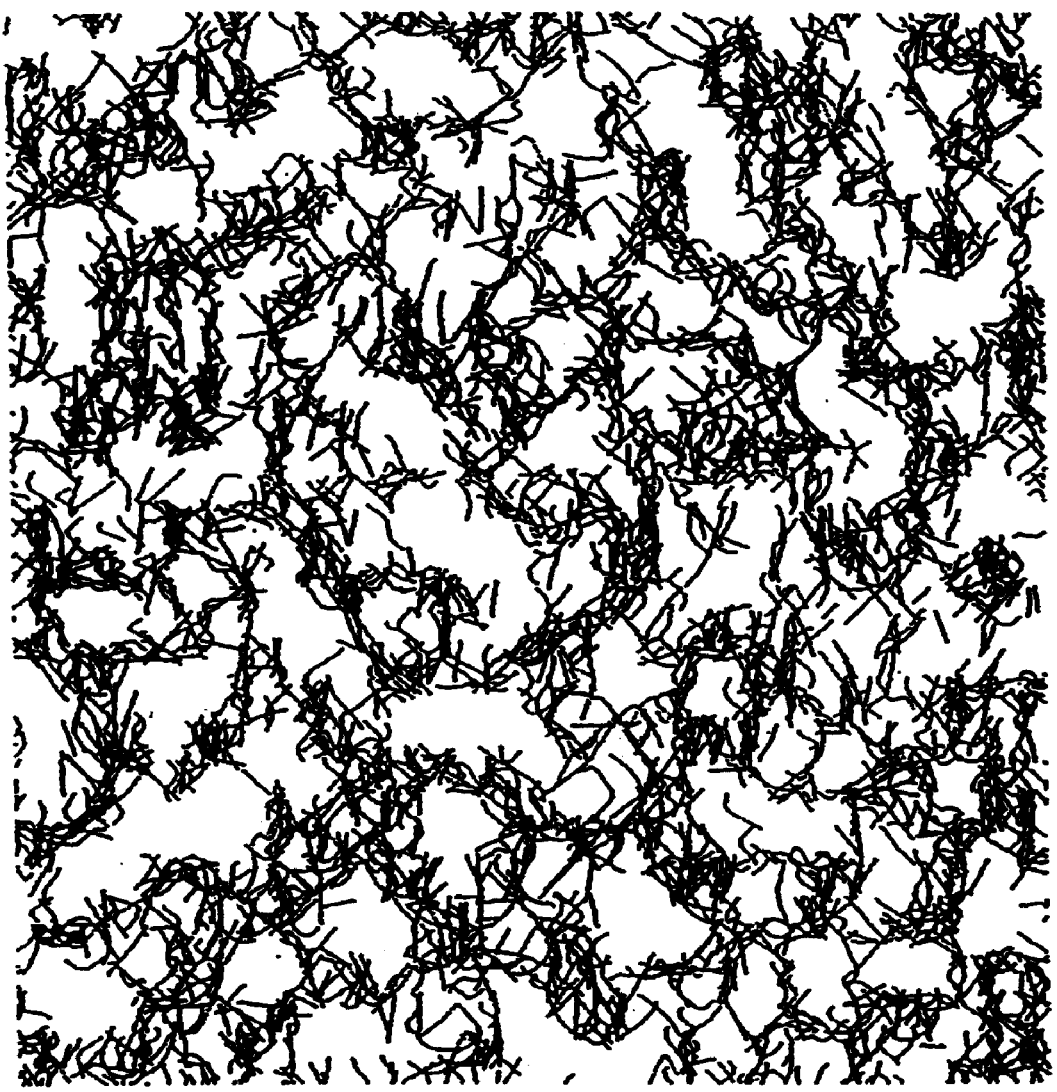
FIG. 7 is an overall diagram of an output image.
Figure 8:
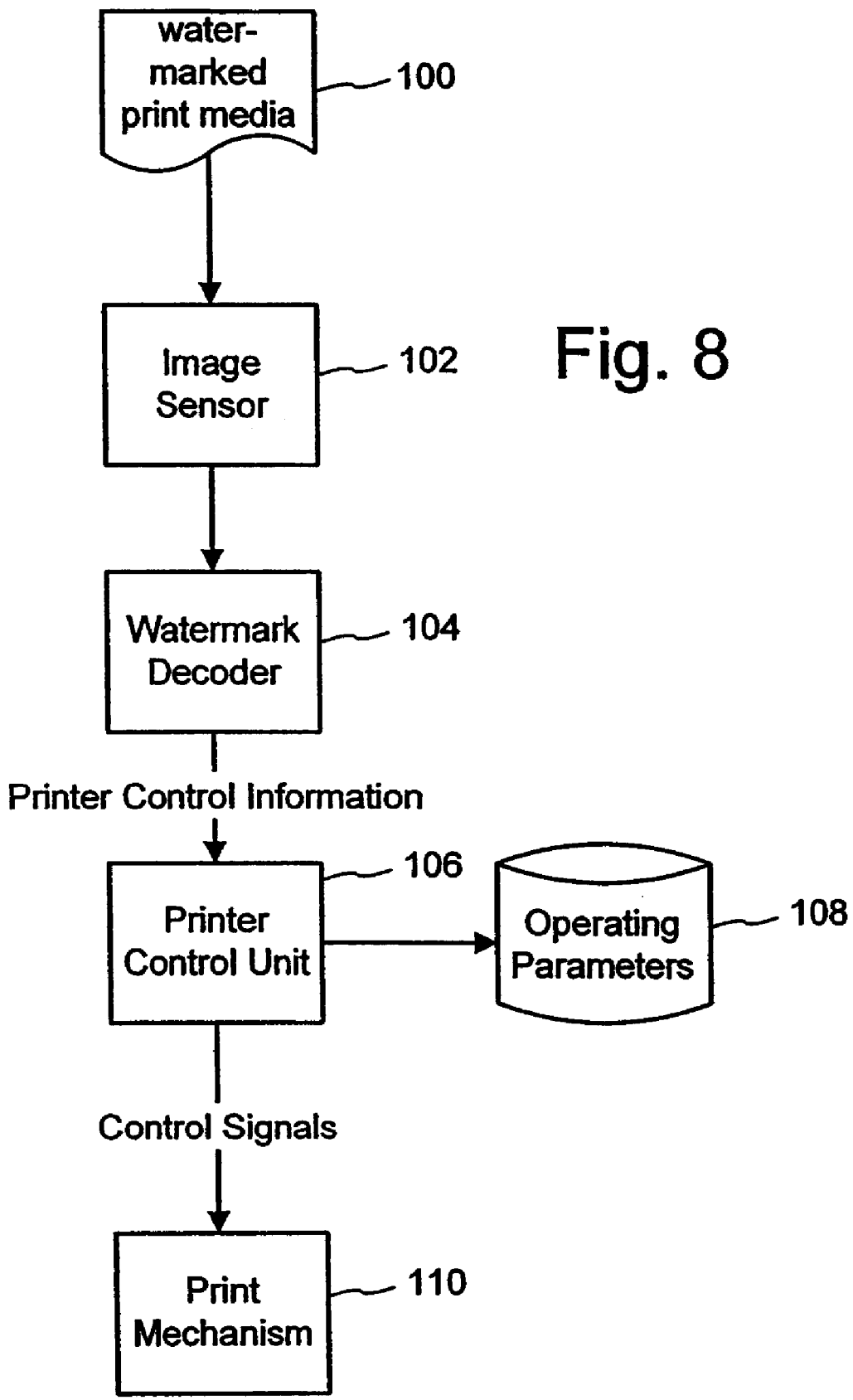
FIG. 8 is a block diagram illustrating a printer architecture that reads digital watermarks to obtain printer control information.

In accordance with one aspect, an embodiment of the invention is a substrate to which final user printing can later be applied to yield a final printed object. The substrate is characterized by having been processed prior to final user printing to yield a steganographic digital watermark pattern thereon. This pattern does not impair subsequent use of the substrate, yet conveys plural bits of digital information. The presence of such information is not apparent to a human observer of the substrate, but can be detected by visible-light scanning of the substrate to yield data from which the plural bit information can be recovered.

The steganographic digital watermark pattern can be formed by ink, which may be, e.g., speckled across at least part of the substrate. Or the ink can form a mesh of thin lines.

(For example, the mesh can comprise a single pattern that is tiled across the substrate, with the pattern being arranged so that lines located at adjoining tile edges meet without discontinuity.) Such inking can serve to impart a colored tint to the substrate, and may be applied by known inkjet printing processes.

The watermark pattern may also be defined by generating a tile specifying one of N luminance values for each of plural different areas, consolidating the N values down to M (where M<N), and then forming lines between such areas in response to the consolidated luminance values. The user may specify line criteria to be used, including whether the lines are straight or curved, and if curved parameters therefor.

The ink used in forming the watermark pattern can be of known types, including clear. The ink may be chosen to optimize watermark detection in the presence of expected illumination spectra, e.g., the illumination cast by a computer monitor.

In other embodiments the steganographic digital watermark pattern can be formed by texturing the substrate (e.g., by force of pressure, by embossing, by an intaglio plate, etc.).

In still other embodiments, the substrate can be processed to locally change its ink absorption ability.

In yet other embodiments, the substrate can include a photographic emulsion, and the watermark pattern can be formed by exposing the emulsion with a pattern (e.g., a noise-like pattern) and thereafter developing the emulsion to make the pattern detectable.

The pattern can be formed on the substrate prior to delivery of the substrate to an end user, e.g., by a producer or supplier of the substrate. Alternatively, the pattern can be formed on the substrate after such delivery.

In some embodiments, the digital watermark pattern may degrade when photocopied, so that the printed object can be distinguished from a photocopy. Such embodiments may also include a second digital watermark pattern—one that is robust against photocopying.

Depending on application, the digital watermark pattern may extend across an entire face of the substrate, or be restricted to certain areas. Likewise, only one side of the substrate—or both—can include watermark patterns. In substrates with laminate construction, the digital watermark pattern may be manifested in a laminate layer. In some embodiments, different regions of the substrate can convey different watermark payloads.

The plural bits of digital information represented by the watermark pattern can comprise an identifier that serves to convey information indicative of an electronic address. More particularly, the identifier can comprise a pointer into a remote data structure, with the remote data structure storing an electronic address corresponding to the substrate.

In some embodiments, the watermark pattern on the substrate may also convey a steganographic orientation signal.

To permit a document printed on such a substrate to be uniquely identified from other—seemingly identical—printed documents, the plural bits of digital information represented by the watermark can comprise serialization information. Alternatively, the digital information can serve to identify the type of substrate to a printer, so that the printer can tailor print parameters accordingly.

The watermark pattern may be formed on a side of the substrate opposite that to which final end-user printing is later applied.

Secret knowledge may be required to decode the plural bits of digital information from the substrate. Thus, a first end user cannot decode information encoded on a substrate of a second end user, and vice versa.

The substrate can take different forms, including an envelope, stationery, etc. The substrate can also comprise printing stock, such as for a security document (e.g., a banknote) or for newspapers and magazines. Or the substrate can comprise a printed check.

The summaries of the priority applications noted earlier are necessarily abbreviated and incomplete; the reader is referred to the cited applications for their full disclosures. Moreover, the disclosures discussed in connection with one application or technology may have antecedents in earlier applications. Again, the reader is referred to the cited applications.

Certain of the cited applications note that document identification technologies other than digital watermarking (e.g., bar codes, RFIDs, etc.) can be used in certain circumstances.

The above-referenced patents and patent applications, together with application Ser. Nos. 09/553,112, filed Apr. 20, 2000, 11/051,442, filed Jul. 19, 2000, and 09/631,409, filed Aug. 3, 2000 (now all abandoned, but respectively included as Appendices A, C and D in allowed application Ser. No. 11/051,442), and Ser. No. 09/803,167, filed Mar. 9, 2001 (now published as US 20020126871), are incorporated herein as if set forth in their entireties.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A substrate useful in forming a printed object, characterized in that the substrate has been marked to encode a steganographic digital watermark pattern thereon that conveys plural bits of digital information, said marking not being apparent to a human observer of the printed object, said steganographic pattern being detectable by visible-light scanning of the printed object to yield data from which the plural bits of digital information can be recovered, wherein said plural bits of digital information correspond to the digital watermark pattern in accordance with an algorithmic transformation, and the marking comprises a speckling of ink dots.

2. The substrate of claim 1 wherein said processing locally changes an ink absorption attribute of the substrate.

3. The substrate of claim 1 wherein the digital watermark pattern degrades when photocopied, so that the printed object can be distinguished from a photocopy thereof.

4. The substrate of claim 3 comprising a second digital watermark pattern, the second pattern being robust against photocopying.

5. The substrate of claim 1 wherein said plural bits of digital information comprise an identifier, said identifier serving to convey information indicative of an electronic address.

6. The substrate of claim 5 in which the identifier comprises a pointer into a remote data structure, the remote data structure storing an electronic address corresponding to said substrate.

7. The substrate of claim 1, wherein the substrate comprises blank printing stock.

8. The substrate of claim 1, wherein the marking comprises a speckling of ink dots in a regular array.

9. The substrate of claim 1, wherein the marking comprises a speckling of opaque ink dots in a regular array.

10. The substrate of claim 1, wherein the marking comprises a speckling of ink dots in an apparently random array.

11. The substrate of claim 1, wherein the marking comprises a speckling of opaque ink dots in a regular array.

12. The substrate of claim 1, formed into a printed package.

13. The substrate of claim 1 wherein said plural bits of digital information serve as a pointer into a remote data structure.

14. The substrate of claim 1 wherein the substrate is blank except for the speckling of ink dots.

15. The substrate of claim 1 wherein at least certain of said ink dots are on a vacant region of substrate to which no other printing pattern is applied.

16. The substrate of claim 1 wherein the steganographic digital watermark pattern is repeated in tiled fashion across at least a part of the substrate.

17. The substrate of claim 1 wherein said plural bits of digital information correspond to the digital watermark pattern in accordance with an algorithmic transformation and a cryptographic key.

18. The substrate of claim 1 wherein each of the dots decreases local luminance of the substrate.

19. The substrate of claim 1 formed into a printed package, wherein:
   said plural bits of digital information correspond to the digital watermark pattern in accordance with an algorithmic transformation and a cryptographic key; and
   at least certain of the ink dots are on a region of the package to which no other printing pattern is applied.

20. A method of processing a blank substrate prior to formation of a printed object, the method comprising encoding the substrate with a steganographic digital watermark pattern that does not impair subsequent use of the substrate, yet conveys plural-bit digital information, said pattern not being apparent to a human observer of the printed object, said steganographic pattern being detectable by visible-light scanning of the printed object to yield data from which the plural bit digital information can be recovered, wherein said plural bits of digital information correspond to the digital watermark pattern in accordance with an algorithmic transformation.

21. The method of claim 20 wherein the digital watermark pattern is designed to degrade when photocopied, so that the original printed object can be distinguished from a photocopy thereof.

22. A method comprising:
   applying an algorithmic transformation to plural bits of digital information to generate pattern data corresponding thereto;
   marking a substrate with dots of ink to encode a steganographic pattern thereon corresponding to said pattern data;
   wherein said marking is not apparent to a human observer of the marked substrate, but the plural bits of digital information are decodable from visible light scan data captured from the marked substrate.

23. The method of claim 22 wherein the substrate includes a visible printing design, and the method includes overprinting the dots of ink thereon.

* * * * *